(12) United States Patent
Mårdberg

(10) Patent No.: US 6,381,960 B1
(45) Date of Patent: May 7, 2002

(54) TURBOCHARGER HOUSING WITH EXHAUST GAS RECYCLING

(75) Inventor: Jörgen Mårdberg, Södertälje (SE)

(73) Assignee: Scania CV Aktiebolag (SE)

( * ) Notice: Subject to any disclaimer, the term of this patent is extended or adjusted under 35 U.S.C. 154(b) by 0 days.

(21) Appl. No.: 09/462,251

(22) PCT Filed: Jun. 22, 1998

(86) PCT No.: PCT/SE98/01200

§ 371 Date: Jan. 5, 2000

§ 102(e) Date: Jan. 5, 2000

(87) PCT Pub. No.: WO99/02830

PCT Pub. Date: Jan. 21, 1999

(30) Foreign Application Priority Data

Jul. 7, 1997 (SE) .............................. 9702612

(51) Int. Cl.⁷ .......................... F02B 37/18; F02M 25/06
(52) U.S. Cl. ....................................... 60/602; 60/605.2
(58) Field of Search .............................. 60/602, 605.2

(56) References Cited

U.S. PATENT DOCUMENTS 4,075,849 A * 2/1978 Richardson .................. 60/602
4,304,097 A * 12/1981 Kondo et al. ................. 60/602
4,611,465 A 9/1986 Kato et al. ..................... 60/602
5,046,317 A * 9/1991 Satokawa ...................... 60/602
5,579,643 A * 12/1996 McEwen et al. .............. 60/602
6,000,222 A * 12/1999 Regnier ....................... 60/605.2

FOREIGN PATENT DOCUMENTS

| EP | 0740065 | 10/1996 | |
| FR | 2322264 | 3/1977 | |
| FR | 2413548 | 7/1979 | |
| JP | 54-148927 | * 11/1979 | ................. 60/605.2 |
| JP | 58-117322 | * 7/1983 | ................... 60/602 |
| JP | 59-203821 | * 11/1984 | ................... 60/602 |

OTHER PUBLICATIONS

Patent Abstracts of Japan, No. 55123344, Sep. 22, 1980, "Exhaust Gas Reflex Apparatus for Diesel Engine".*

* cited by examiner

Primary Examiner—Michael Koczo
(74) Attorney, Agent, or Firm—Ostrolenk, Faber, Gerb & Soffen, LLP

(57) ABSTRACT

A turbocharger for an internal combustion engine and which has a housing with a turbine housed in a chamber in the housing, and driven by exhaust gases from the engine. The turbocharger has an integral EGR valve and wastegate.

9 Claims, 1 Drawing Sheet

TURBOCHARGER HOUSING WITH EXHAUST GAS RECYCLING

FIELD

This invention relates to turbochargers of the type used in cooperation with internal combustion engines, mainly compression ignition engines. In particular the invention relates to a turbocharger housing having a chamber for a turbine and having passageways in the housing for passage of exhaust gas and relates to a turbocharger which includes these elements as well as a wastegate and an EGR valve.

BACKGROUND

A turbocharger has a compressor located in the air intake system of an internal combustion engine in order to increase the amount of air and thereby also the fuel delivered to a combustion chamber to increase power output from an engine. The compressor is driven by a turbine located in the exhaust gas outlet and connected to the compressor by a shaft.

This has two advantages: 1) the engine is more efficient because it utilizes energy recovered from the exhaust gas flow and 2) a smaller engine can be made to produce a given power output.

The power available to drive the compressor is a nonlinear function of engine speed so that there is little boost at low speeds whereas at high speeds the boost is at a maximum. Most turbochargers are connected to a wastegate which enables exhaust gases to bypass the turbine, and which makes it possible to regulate the manifold pressure. The wastegate is typically controlled by a diaphragm that senses boost pressure.

In order to meet environmental considerations in relation to exhaust gases produced in the combustion chamber, turbochargers may also be included in an exhaust gas recycling (EGR) system where a percentage of the exhaust gases are recirculated through the combustion chambers. This is typically achieved by returning an amount of the exhaust gas to the inlet manifold.

Typically the engine exhaust manifold is made with connections to the turbocharger, EGR, and wastegate, and the turbocharger is made with corresponding connections. The EGR valve, and wastegate are bulky and all the associated connections are susceptible to leaking.

STATEMENTS OF INVENTION

An object with the present invention is provide turbo charged engines with EGR valves and/or wastegate valves that neither requires a lot of space, nor is suseptible to leaks. Accordingly there is provided a turbocharger housing for an internal combustion engine which has a chamber for the turbine, an exhaust gas outlet downstream of the turbine chamber, exhaust gas inlets upstream of the turbine chamber and passageways to the turbine chamber and out the turbine chamber, including passageways or chambers for housing at least one wastegate and EGR valve.

By providing the turbocharger housing with at least one chamber and/or passageway for housing at least one of a wastegate and EGR valve the above mentioned objects will be accomplished. Preferably, the housing has a respective chamber and/or passageway for at least one wastegate, preferably two, and at least one EGR valve, preferably two EGR valves.

The two wastegate passageways may be connected to the turbine chamber exhaust gas outlet downstream of the wastegate location to form a single exhaust gas outlet port for exhaust gases exiting the housing.

The housing may further include a pair of exhaust gas inlet ports for the turbine chamber and each inlet port opens into a respective passageway for an EGR valve and a wastegate.

Also according to the invention there is provided a turbocharger for an internal combustion engine and which has a turbine driven by exhaust gases from the engine and includes integrally within the turbocharger at least one of a wastegate and EGR valve.

Yet a further aspect of the invention provides a method of installation on an internal combustion engine of a turbocharger, wastegate, and/or EGR valve.

Although a turbocharger housing according to the invention is more complicated than a conventional turbocharger housing, since the whole is supplied as a single unit it is easier to assemble to a vehicle during manufacture of the vehicle, and can be replaced during maintenance as a single unit. The invention will be described by way of example and with reference to the accompanying drawing.

DESCRIPTION OF INVENTION

Figure 1:
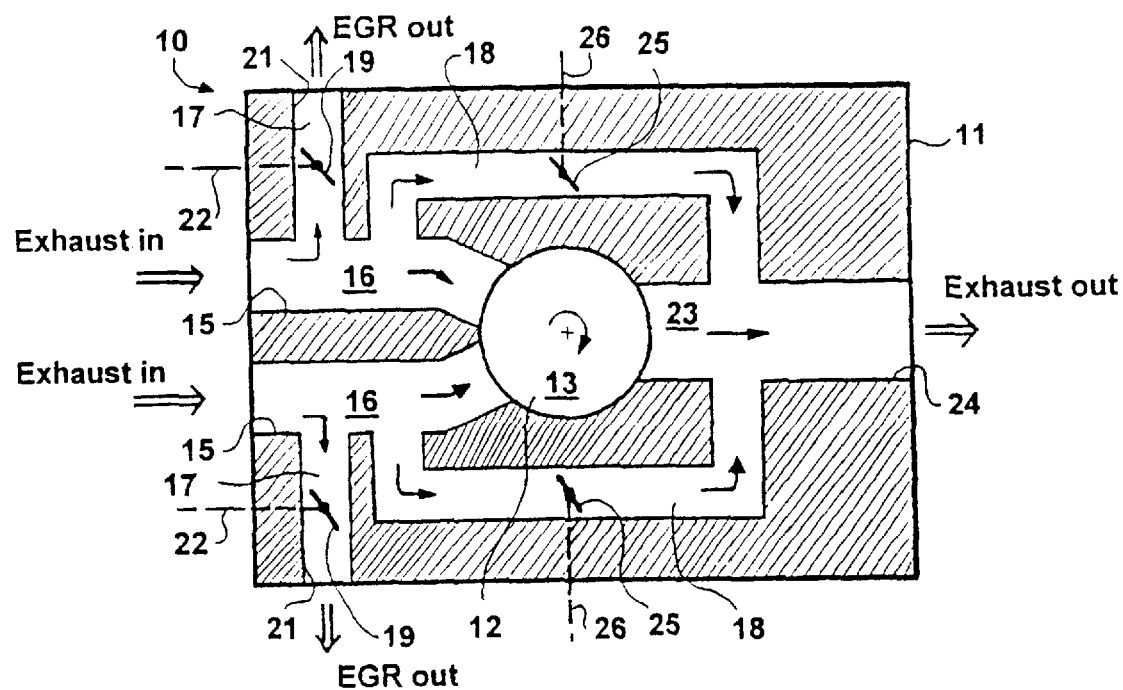
FIG. 1 is a schematic drawing of a turbine housing of a turbocharger. It will be appreciated that the housing can be shaped as is desired to accommodate the turbocharger on a particular engine.

With reference to the accompanying schematic drawing FIG. 1, a turbocharger 10 has a housing 11 of a suitable material such as a shaped and machined metal, typically steel or iron. The housing 11 includes a turbine chamber 12 housing a turbine 13 which is mounted on a shaft (not shown) connected to a compressor, as is well known for turbochargers.

The turbocharger in use is connected to a pair of exhaust manifolds as might be used in a direct injection diesel engine arranged in a V configuration. Alternatively the pair of exhaust manifolds might be connected to two different sets of cylinders as might be used in an engine with the cylinders arranged in line.

The housing 11 has a respective exhaust inlet port 15 for each engine exhaust manifold. In this case there are two inlet ports 15 each for connection to one of the two exhaust manifolds. Each inlet port opens into a respective passageway 16 connected to the turbine chamber 12.

Each passageway 16 also connects to two further passageways 17 and 18. Each passageway 17 houses an EGR control valve 19 which may be located in the passageway 17, or in a chamber (not shown) formed in the passageway 17. The two passageways 17 have outlet ports 21 that connect to the engine exhaust gas recycling system. The EGR valves are connected to control lines 22 in the conventional manner.

The passageways 18 both bypass the turbine chamber 12 and combine with the exhaust gas outlet 23 from the turbine chamber 12 so that the passageways 18 and outlet 23 merge into a single exhaust gas outlet port 24. The outlet port 24 is connectable with the vehicle exhaust system. A wastegate 25 is located in each passageway 18, or a chamber formed therein (not shown) and is controlled by control line 26, either electronically or mechanically by a diaphragm as is well known.

The provision of two EGR valves 19 and two wastegates 25 reduces the possibility of an imbalance in pressures between the two exhaust manifolds that otherwise could occur, and will result in balanced pressures to the turbine chamber.

What is claimed is:

1. A housing for a turbocharger for an internal combustion engine, the housing including:
   a turbine chamber for receiving a turbine;
   an inlet to the turbine chamber and an exhaust outlet from the turbine chamber; and
   at least one passageway through the housing for holding an EGR valve, and at least one passageway through the housing for holding at least one wastegate;
   wherein there are more than one of the passageways respectively for at least one wastegate and for at least one EGR valve; and
   wherein the housing has respective ones of the passageways located outside the turbine chamber for receiving at least two of the wastegates and two of the EGR valves.

2. The housing of claim 1, further comprising a pair of gas inlets connected to the turbine chamber;
   each gas inlet communicating into a respective one of the at least two second passageways, the at least two first passageways communicating with the gas inlet and being separate from the at least two second passageways.

3. The housing of claim 1, wherein the passageway communicates with the exhaust inlet to housing, while bypassing the turbine chamber.

4. A housing for a turbocharger, wherein the housing includes a chamber therein for receiving a turbine, a pair of exhaust gas inlet ports to the housing and communicating to the turbine chamber and an exhaust gas outlet from the housing and communicating with the turbine chamber;
   at least two wastegate passageways through the housing communicating from the exhaust gas inlet ports respectively, bypassing the turbine chamber and connected to the exhaust gas outlet to thereby form the exhaust gas outlet for exhaust gases exiting the housing;
   each of the wastegate passageways being adapted to receive exhaust gas therein for bypassing the turbine chamber, wherein
   each exhaust gas inlet port communicates into a respective one of the wastegate passageways, and a separate EGR valve passageway communicates with at least one of the exhaust gas inlet ports, separate from the wastegate passageway and adapted to receive an EGR valve therein.

5. A housing of claim 4, wherein the turbine chamber receives a turbine.

6. The housing of claim 4, further comprising a wastegate in at least one of the at least two wastegate passageways and an EGR valve in the EGR valve passageway.

7. The housing of claim 6, further comprising another wastegate in the other one of the at least two wastegate passageways.

8. The turbocharger of claim 7, further comprising an EGR valve in the EGR valve passageway.

9. The housing of claim 4, further comprising another EGR passageway adapted to receive another EGR valve therein.

* * * * *